April 14, 1964   W. G. SCHINSKE   3,128,652
ADJUSTABLE WIRE STRIPPER
Filed May 17, 1962   2 Sheets-Sheet 1
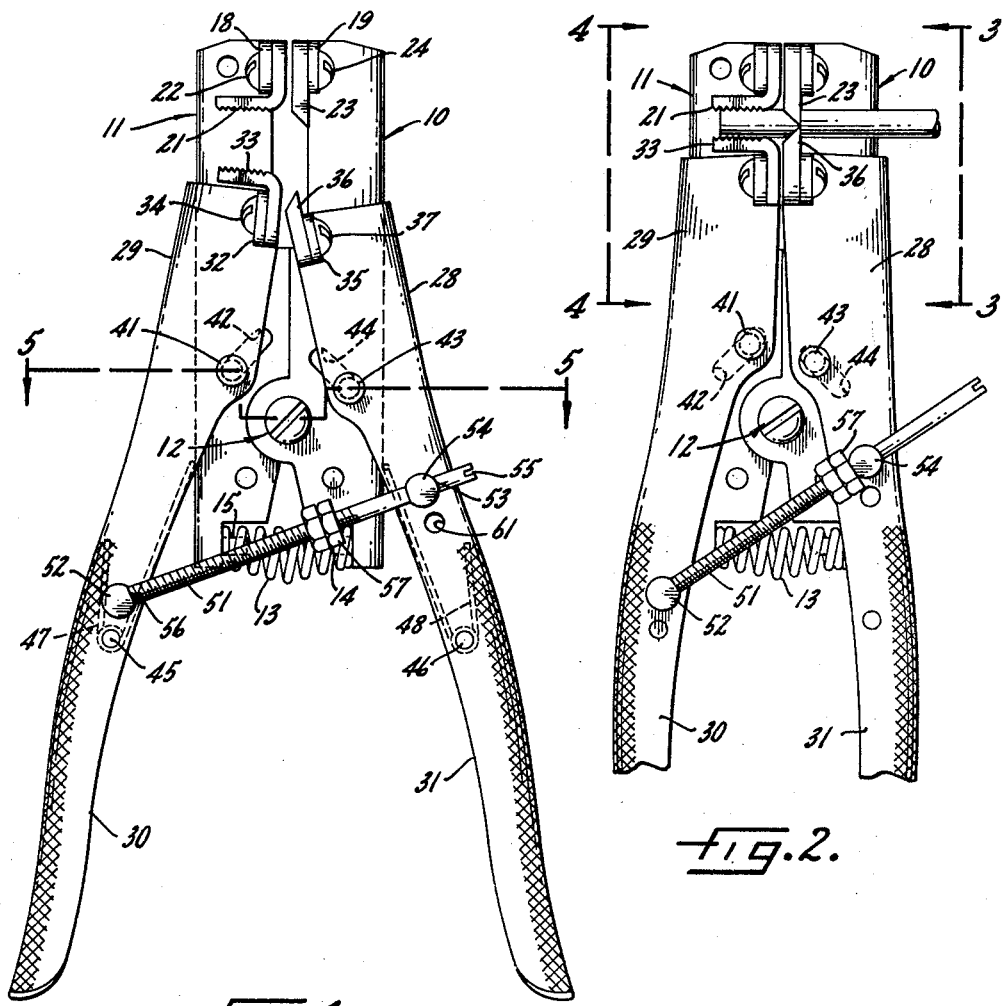
Fig. 1.
Fig. 2.
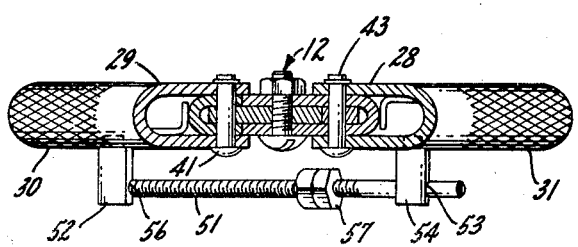
Fig. 5.
INVENTOR.
William G. Schinske,
BY Parker & Carter
Attorneys.

April 14, 1964   W. G. SCHINSKE   3,128,652
ADJUSTABLE WIRE STRIPPER
Filed May 17, 1962   2 Sheets-Sheet 2

INVENTOR.
William G. Schinske,
BY Parker & Carter
Attorneys.

United States Patent Office 3,128,652
Patented Apr. 14, 1964

3,128,652
ADJUSTABLE WIRE STRIPPER
William G. Schinske, Sycamore, Ill., assignor to Ideal Industries, Inc., Sycamore, Ill., a corporation of Delaware
Filed May 17, 1962, Ser. No. 195,549
8 Claims. (Cl. 81—9.5)

This invention relates to a wire stripper, and particularly relates to a stripper in which the gripper blades are separated to permit the cut slug on a covered electrical conductor to be shaken loose.

An object of this invention is a wire stripper in which a covered wire may be stripped and removed from the stripper without displacing the exposed electrical conductor.

Another object is a wire stripper in which electrical conductors having multiple strands may be exposed and removed without displacing any of the exposed strands.

Another object is a wire stripper wherein the gripper blades are first made to engage the electrical wire and then separate to permit the cut slug to drop from the gripper blades.

Another object is a wire stripper which will accommodate electrical conductors of various diameters.

Another object is a wire stripper in which the separation between the gripping blades may be adjusted.

Another object is a wire stripper in which paired gripping blades are separated from opposed paired cutting blades about one pivot, and in which the paired gripping blades are separated about a second pivot.

Another object is a wire stripper in which an elongated member extends between a gripping carrier and a blade carrier, and the member has a stop to provide a pivot.

Another object is a wire stripper in which an elongated member is fixed at one end to a gripping carrier and the other end slidably moves at a fixed and elevated position on the blade carrier.

Another object is a wire stripper in which an elongated member is connected at one end to the gripping carrier, the other end slides freely at a fixed elevated position on the blade carrier, and an adjustable intermediate stop provides a pivot.

Figure 3:
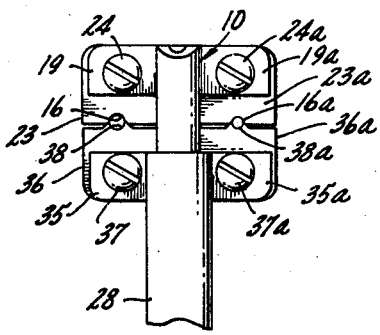
Figure 4:
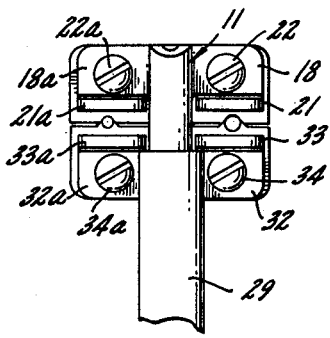
Figure 6:
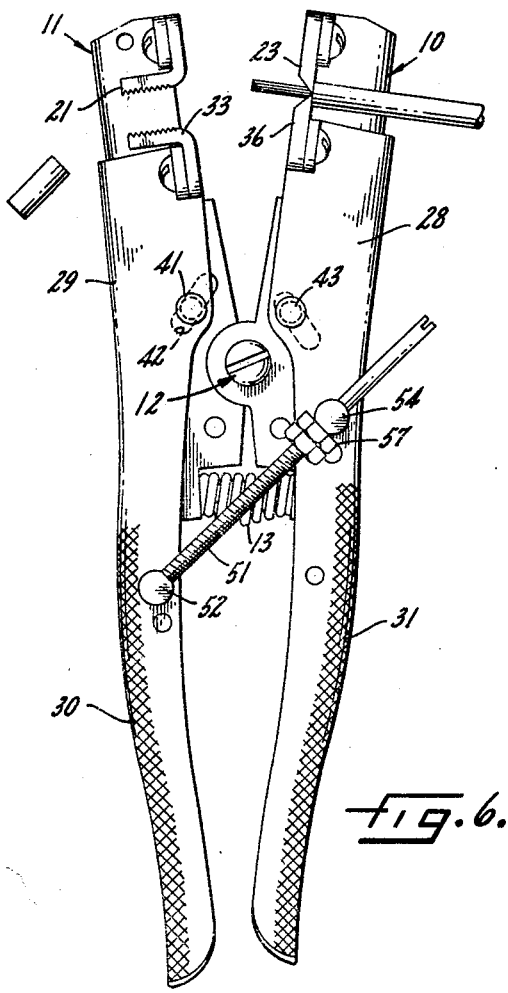

Such objects are achieved by the invention which will be described in detail and which is illustrated in the accompanying drawings wherein:

FIGURE 1 is a front elevational view of the wire stripper,

FIGURE 2 is a front elevational view of the stripper in a cutting and gripping position, FIGURE 3 is a view along line 3—3 of FIGURE 2, FIGURE 4 is a view along line 4—4 of FIGURE 2, FIGURE 5 is a view along line 5—5 of FIGURE 1, and FIGURE 6 is a front elevational view of the stripper in a slug removal and disposal position.

The same numerals in the various views will refer to the same structures.

The wire stripper shown here is of the type disclosed in U.S. 2,179,581. The stripper has a pair of jaws 10, 11 joined about a pivot 12 and biased towards a closed position by a coil spring 13, the ends of which engage lugs 14, 15. Jaw 10 has lateral segments or lugs 19 and 19a extending from the front and back of the jaw 10. Jaw 11 also has lateral segments or lugs 18 and 18a extending in a similar manner. Bent gripping blades 21 and 21a are fixed to lugs 18, 18a by screws or the like 22 and 22a; and upper cutting blades 23 and 23a are fixed to lugs 19, 19a by screws or the like 24, 24a. The upper cutting blades have notches 16 and 16a which form a circular cutting surface together with matching notches 38, 38a in the lower cutting blades 36, 36a.

Carrier 29 is slidably engaged to jaw 11, and the carrier is generally dimensioned to fit the contour of the underlying jaw. Carrier 28 is similarly shaped and engaged to jaw 10. Carriers 28 and 29 continue at their lower ends into handle portions 30 and 31. Carrier 29 has lateral segments or lugs 32 and 32a extending from the front and back to which are fixed lower gripping blades 33 and 33a by screws or the like 34 and 34a. Carrier 28 has similar lateral segments or lugs 35 and 35a to which are fixed lower cutting blades 36 and 36a by screws or the like 37 and 37a.

Carrier 29 is engaged to jaw 11 by a rollpin 41, fixed to the front and back of carrier 29 riding in an upwardly angled cam slot 42. Carrier 28 is similarly engaged to jaw 10 by fixed rollpin 43 riding in cam slot 44.

Towards the handle portions of each carrier are positioned pins 45, 46 which anchor coil springs 47, 48 that tend to urge the handle portion of the carriers away from the jaws 10 or 11. It is seen that the upper portions of the carriers 28 and 29 contact their respective jaws because of the particular angular placement of the cam slots 42, 44 and pins 41 and 43 slidably engaged therein. When handles 30 and 31 are moved towards each other, pins 41 and 43 travel in the respective cam slots 42 and 44, and come to rest intermediate the ends of the slots when blades 33, 36 are in gripping and cutting positions. This is shown in FIGURE 2, and it is seen that the lower gripping blade has been moved to the upper gripping blade so that the gripping surfaces are generally parallel and tightly engage the insulation of an electrical wire placed therebetween. Also, the lower cutting blade on the carrier has been moved into contact with the upper gripping blade to form a circular cutting surface with the respective notches and thereby cut the insulation cover of an electrical conductor placed therebetween.

An elongated member or rod 51 is shown extending between carriers 28 and 29. This rod is removably fixed at one end in a block 52 on carrier 29 and the other end slides in bore 53 in block 54 on carrier 28. One end of the elongated rod 51 may have means such as a slot 55 to engage and disengage a threaded portion in a threaded bore 56 of block 52. The threaded portion on the elongated rod is also used to advantage to adjustably position a stop 57 along its length. The stop is shown here as a double abutting nut to provide secure surface contact, but a wide variety of stop elements may be used.

Stop 57 is desirably positioned on the elongated member or rod 51 so that it generally contacts block 54 when gripping blades 21 and 23 make a firm contact with the insulation cover of the wire. At the same time, cutting blades 23 and 36 have closed and cut through the insulation cover. In this position, pins 41, 43 have traveled a length of the cam slots 42 and 44, as shown in FIGURE 2. The continued movement of handles 30, 31 towards each other strips the slug from the wire and then provides a second pivot at stop 57 abutting block 54. The second pivot causes pin 41 along with the carrier 29 fixed thereto to ride down cam slot 42 as shown in FIGURE 6, and, simultaneously, gripping blade 33 moves away from the gripping blade 21.

Elongated member or rod 51 is generally positioned between the carriers so that the end of the rod moving through bore 53 in block 54 is at an elevated position with respect to the other end of the rod removably fixed in block 52. The actual elevation of block 54 on carrier 28 may be selected so that pin 41 sits at the other end of cam slot 42 when stop 57 abuts block 54. It will be understood that variations are possible so that pin 41 may be positioned somewhere intermediate the ends of cam slot 42 when stop 57 intercepts block 54. This is realized by lowering block 54 and engaging it in a threaded aperture such as 61 on carrier 28. This will provide a wider opening between gripping blades 21 and 33.

The positions between the gripping blades may, however, be more conveniently adjusted by moving stop 57 along rod 61. As stop 57 is moved farther away from block 54 on carrier 28, the gripping blades 21 and 33 will be spaced closer together. As stop 57 is adjustably positioned closer to block 54, then gripping blades 21 and 33 will be spaced farther apart.

The use and operation of my invention are as follows:

At the beginning of the stripping operation, the wire stripper is in the open position generally shown in FIGURE 1. The block 54 has been previously positioned on carrier 28 and stop 57 has been positioned along the length of rod 51 so that gripping blades 21 and 33 move to a desired spacing for gripping a given covered electrical wire.

The wire is placed between the notches in cutting blades 23 and 36, and a desired length of the wire is placed between the gripping blades 21, 33. This length of wire will be the length exposed, and the gripping blades will hold the cut cover slug. Handles 30 and 31 are moved towards each other and carriers 28 and 29 move upward as their respective pins travel in the cam slots of jaws 10 and 11. The gripping blade 33 and cutting blade 36 mounted on the carriers move respectively into a gripping and cutting relationship with the fixed gripping and cutting blades.

After the cutting operation, the handles 30 and 31 are moved closer together and this forces jaws 10, 11 to separate as pins 41 and 43 travel in cam slots 42 and 44. The separation of jaws 10, 11 from each other results in the stripping operation, that is, the cut slug held between the gripping blades 21 and 33 is removed from the electrical conductor. If the jaws 10, 11 were permitted to return to their closed position at this time, the slug retained between gripping blades 21 and 33 would contact the exposed strands of electrical conductors and displace their normal alignment. This would result in an exposed electrical conductor becoming messy and tending to make the work involved in electrical connections less efficient. It is, however, provided that the continual movement of handles 30 and 31 towards each other provides a second pivot point at the abutment of stop 57 with block 54 on carrier 28. This second pivot point unseats pin 41 from one end of cam slot 42, and such pin rides down the cam slot. The carrier 29 fixed to pin 41 will then move down, and gripping blade 33 carried by the carrier will move away from gripping blade 21. The cut slug will then fall from between the gripping blades. The wire stripper may then be returned to a closed position, the handles released, and the exposed electrical conductor removed without any displactment occurring to its aligned electrical strand or strands.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

I claim:

1. An adjustable wire stripper for removing insulation covers from electrical conductors and the like which includes, in combination, a pair of separable jaw members movable about a first pivot, means to urge said members towards a closed position, a stationary gripping blade on one jaw member, a stationary cutting blade on the other jaw member, a cutting blade carrier having a cutting blade mounted thereon slidably engaged with one jaw member to move the cutting blade towards the stationary cutting blade, a gripping blade carrier having a gripping blade mounted thereon slidably engaged with the other jaw member to move the gripping blade towards the stationary gripping blade, means to separate said jaw members, a stop means of adjustable length joining said carriers, said stop means interrupting the movement of the gripping carrier and providing a second pivot to move the gripping blade on the carrier away from the gripping blade on the jaw member.

2. The wire stripper as in claim 1 wherein said jaw member separating means further includes handles extending from the carriers.

3. The wire stripper of claim 1 further characterized in that each carrier has a jacket portion with opposed walls joined by a rollpin which slidably engages a longitudinal slot in the jaw member.

4. The wire stripper of claim 1 further characterized in that the stop is an elongated member having one end removably fixed to one carrier, the other end slidably engaged in a block fixed at a higher level on the other carrier, and a projection intermediate the ends to intercept the block as the elongated connector is moved by the first carrier.

5. The wire stripper of claim 1 further characterized in that a portion of each carrier is biased away from its associated jaw member.

6. A wire stripper for removing insulation covers from electrical conductors and the like which includes, in combination, separable jaw members movable about a pivot, a spring biasing the jaw members towards a closed position, a stationary cutting blade on the first jaw member, a stationary gripping blade with a lateral gripping surface on the second jaw member, a cutting blade carrier having a cutting blade mounted thereon, spaced walls on the carrier adapted to closely fit the first jaw member, said spaced walls having a rollpin fixed therebetween, said rollpin slidably engaging an angular slot in the jaw member, a portion of the cutting carrier biased away from the jaw member, a gripping blade carrier having a gripping blade mounted thereon, spaced walls on the carrier adapted to closely engage the other jaw member, a rollpin extending between said spaced walls, said rollpin slidably engaged in an angular slot in the other jaw member, a portion of the gripping carrier biased away from the second jaw member, said carriers movable to cut an insulation cover between the cutting blades and to grip the slug between the gripping blades, said jaw members separable to strip the slug, a block on the gripping carrier, one end of an elongated member removably fixed to the block, a block on the cutting blade carrier, the elongated member slidable through a bore in said block, the block on the cutting carrier positionable at various levels, and a stop intermediate the ends of the elongated member to intercept the block on the cutting carrier and provide a second pivot to permit the gripping carrier to move downward and thereby move the gripping blade thereon away from the stationary gripping blade to permit a cut slug to drop from between the gripping blades.

7. In a wire stripper for removing insulation covers from electrical conductors and the like having separable jaw members movable about a pivot and biased towards the closed position, a gripping blade carrier with opposed walls closely fitting one jaw member, said gripping carrier slidably engaged to the jaw member by a rollpin extending between the walls and riding in a longitudinal slot in the jaw member, a cutting blade carrier having opposed walls closely engaging the other jaw member and slidably engaged to that frame member by a rollpin extending between the walls and riding in a longitudinal slot in the jaw member, a cutting blade movable with the cutting blade carrier and a gripping blade movable with the gripping blade carrier, said carriers angularly biased away from the jaw members, a cutting blade fixed on one jaw and a gripping blade fixed to the other jaw, the carriers movable to cut an insulation cover between the cutting blades and to grip a slug between the gripping blades, the jaw separable to strip the slug, a stop of adjustable length joining said carriers which includes, in combination, a block fixed to the gripping carrier, one end of an elongated rod removably fixed in the block, another block fixed in the cutting carrier at a higher level, an enlarged bore in said block permit the other end of the elongated rod to slide through the bore, a threaded portion on the rod and a threaded stop adjustably positioned on the threaded portion to intercept the block on the cutting carrier and provide a pivot to move the gripping carrier away from the fixed gripping blade, whereby a cut insulation slug between the gripping blades is released and dropped out of the wire stripper.

8. In a wire stripper, a pair of levers pivoted together, handles connected to the levers for pivoting them, two pairs of jaws on the stripper, one for gripping and the other for cutting, constructed to perform an opening and closing action upon initial manual closing of the handles so as to grasp a wire to be stripped placed between the jaws, means for pivoting the levers apart to separate the gripping jaws from the cutting jaws upon additional closing of the handles, and means for opening the gripping jaws somewhat upon further manual closing of the handles so that the insulation stripped from the wire will be free to fall out or be removed.

References Cited in the file of this patent

UNITED STATES PATENTS

| | | |
|---|---|---|
| 2,622,461 | Valiulis | Dec. 23, 1952 |
| 2,659,254 | Wood | Nov. 17, 1953 |
| 2,770,154 | Schinske | Nov. 13, 1956 |
| 2,842,992 | Hindenburg | July 15, 1958 |
| 2,929,284 | Hagstrand | Mar. 22, 1960 |
| 3,002,408 | Schwalm et al. | Oct. 3, 1961 |